Figure 1:
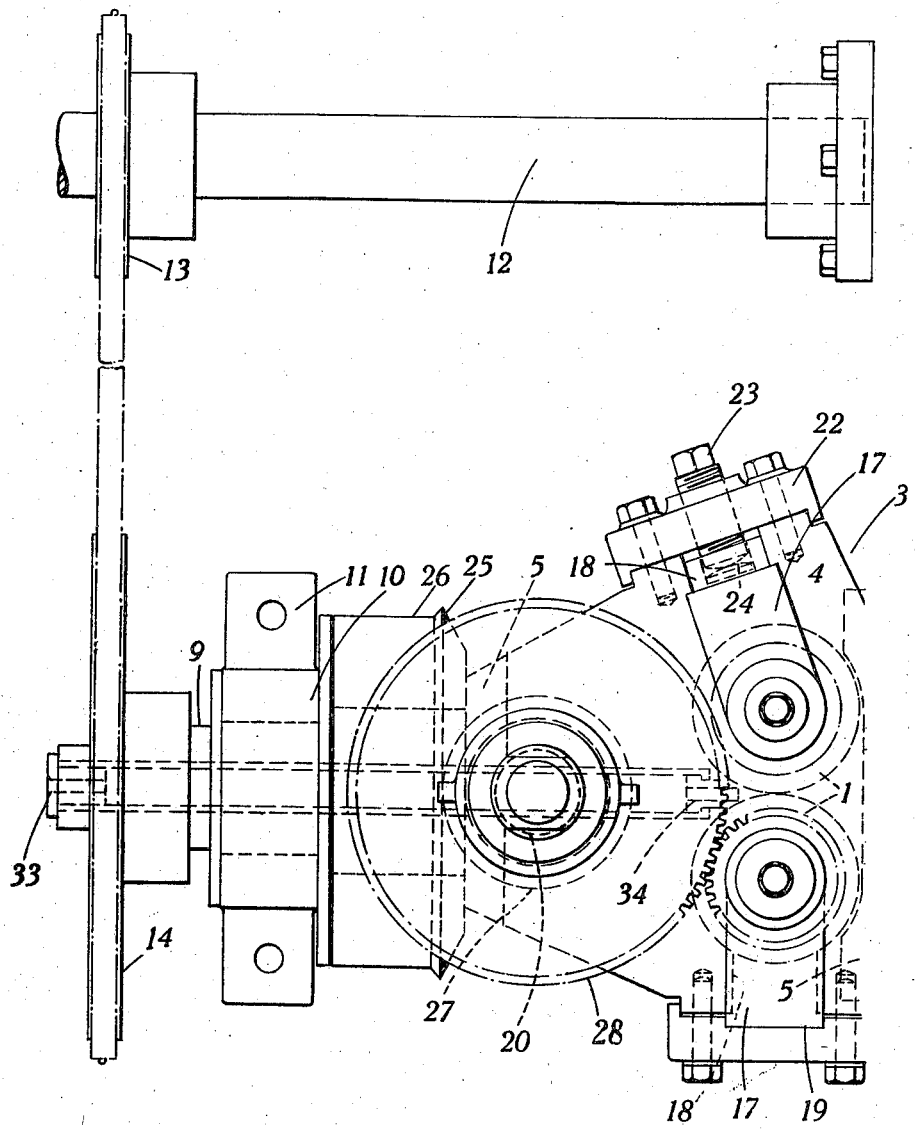

Aug. 30, 1938.  P. V. HUNTER ET AL  2,128,777
MACHINE FOR PRODUCING WIRE STRANDS
Filed June 3, 1937    4 Sheets-Sheet 1

INVENTORS
PHILIP VASSAR HUNTER
and HARRY HILL
BY
Stebbins, Blenko + Parmelee
ATTORNEYS Aug. 30, 1938.   P. V. HUNTER ET AL   2,128,777
MACHINE FOR PRODUCING WIRE STRANDS
Filed June 3, 1937   4 Sheets-Sheet 2

INVENTORS
PHILIP VASSAR HUNTER
BY and HARRY HILL
Stebbins, Blenkoor Parmelee
ATTORNEYS Aug. 30, 1938. P. V. HUNTER ET AL 2,128,777
MACHINE FOR PRODUCING WIRE STRANDS
Filed June 3, 1937  4 Sheets-Sheet 4

INVENTORS
PHILIP VASSAR HUNTER
and HARRY HILL
BY
ATTORNEYS

Patented Aug. 30, 1938

2,128,777

UNITED STATES PATENT OFFICE 2,128,777

MACHINE FOR PRODUCING WIRE STRANDS

Philip Vassar Hunter, London, and Harry Hill, Belvedere, Kent, England, assignors to Callender's Cable and Construction Company Limited, London, England, a British company Application June 3, 1937, Serial No. 146,247
In Great Britain June 17, 1936

7 Claims. (Cl. 117—16.5)

This invention deals with the production of stranded members particularly for the conductors of multicore electric cables of the noncircular, pre-spiralled type. The term "prespiralled" is understood to indicate that, in the process of manufacture of each of the conductors before the application of insulating material, the conductor is formed so as to have a twisted appearance, being of the same section at all points, but having this section progressively rotated about its axis as it travels along the conductor. This formation of the conductors (which are subsequently to be insulated and then assembled in a cable by being laid up together) has the effect of facilitating the laying up which can be done with very little, if any, distortion of the conductor from the pre-spiralled form. For this, it is necessary that the lay of the cores when assembled together should be equal to the length of conductor in which the section makes a complete rotation about its axis. This is often referred to as the pre-spiralled lay.

In manufacturing non-circular pre-spiralled strand it is a common practice to employ a rotating stranding head comprising a pair of rolls of which the peripheral surfaces combine to form a die aperture of the required shape, and for the wires to be drawn into and through the rotating die and for the strand to be drawn off by means of tension applied to the finished strand, for instance, by a draw-off capstan round which the strand has been given the necessary number of turns. In that arrangement practically the whole of the power required for drawing forward the wires and combining them into the strand is applied by way of the draw-off capstan, or its equivalent, and is transmitted through the finished strand in tension.

In the specification of U. S. Patent No. 1,947,775 is described a stranding head in which the forming and squeezing work, or a large part of it, performed on the strand by the rolls forming the die, is applied by directly driving these rolls instead of by the pull exerted through the finished strand. This has the advantage of producing a more accurate and less workhardened strand than by the other method. The finished strand is not stretched by the tension applied to it and the pressure of the strand on the capstan can be very much less in the second case than in the first, so that local deformation of the strand by this means is avoided.

By the present invention we provide a stranding head having two roll dies which each comprise a pair of rolls driven by power transmitted to them other than by the strand passing therethrough. The rolls of the second die are arranged to follow closely the rolls of the first die and to act upon the strand in a direction transverse to that in which the rolls of the first die act. This improved form of stranding head enables a more intense, or more uniform, squeezing action to be exerted on the strand.

Figure 1A:
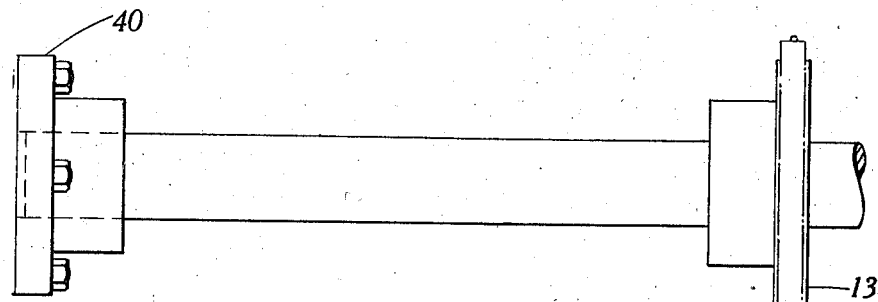
Figure 1A:
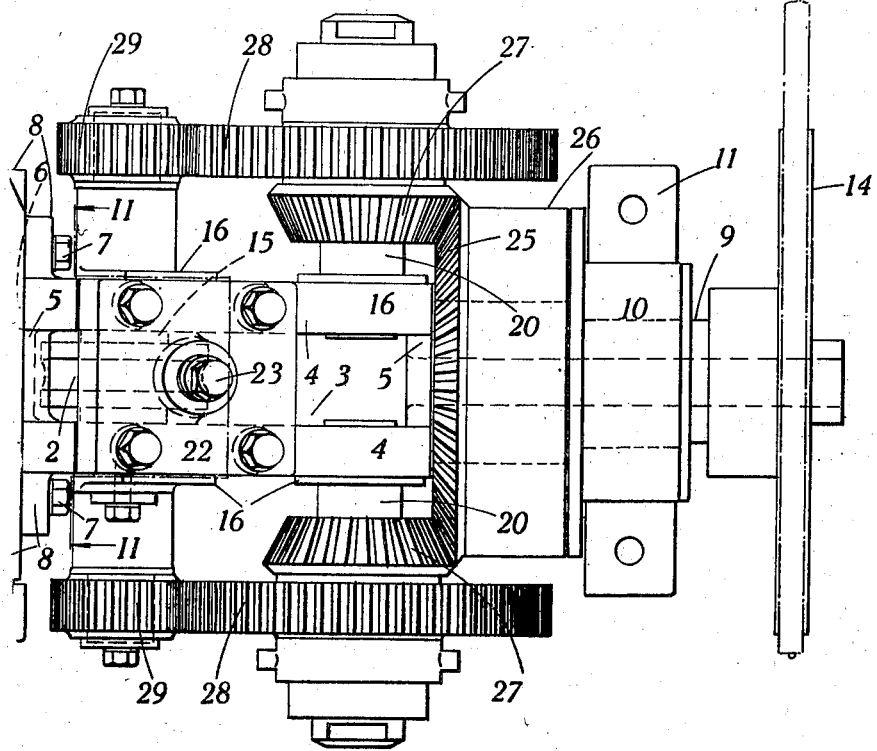
Figure 2:
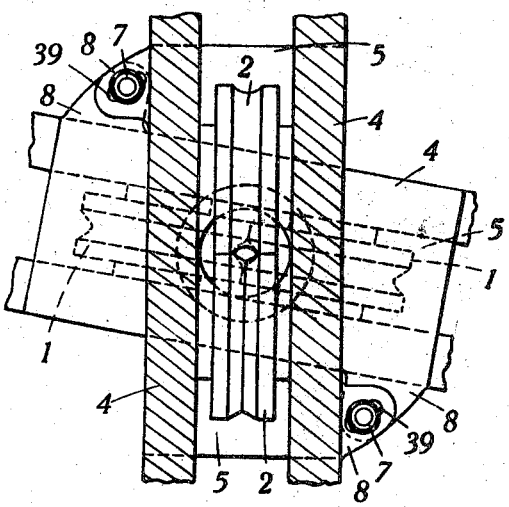
Figure 3:
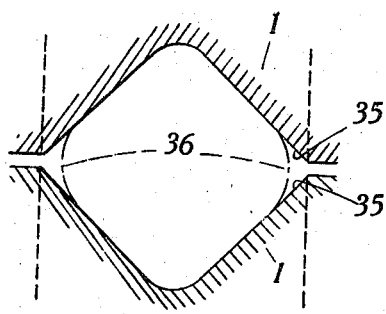
Figure 4:
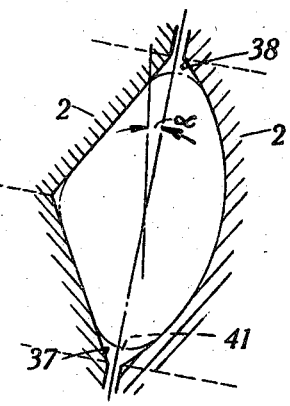
Figure 5:
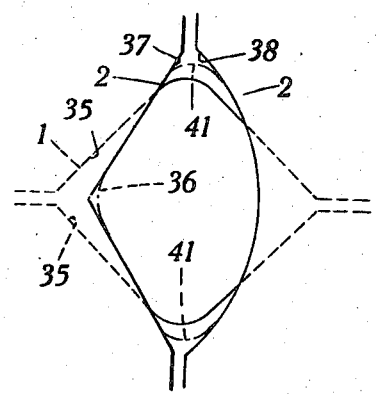
Figure 6:
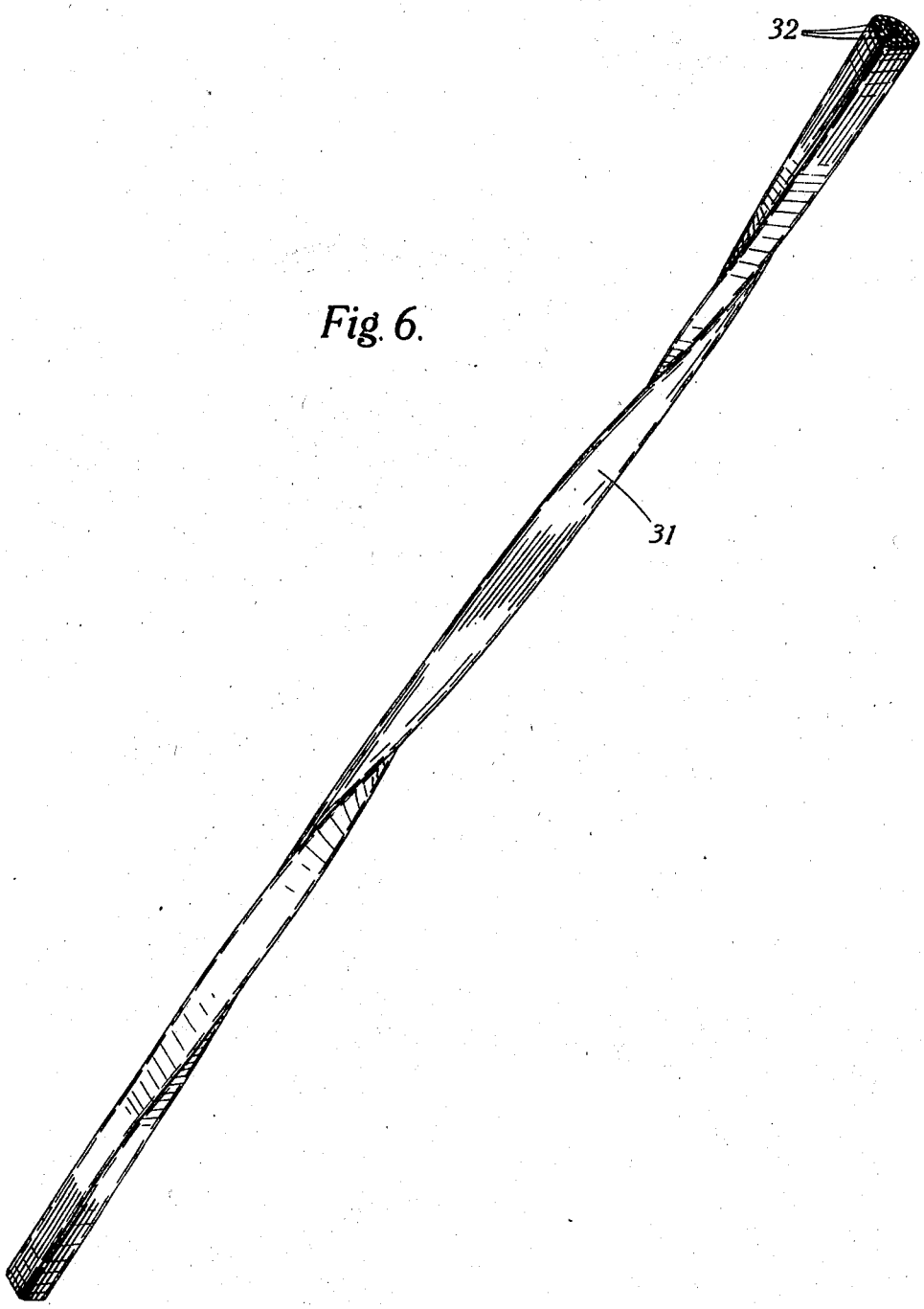

The invention will be further described with the aid of the accompanying drawings wherein Figures 1 and 1a together show a plan view of one particular form of stranding head, constructed in accordance with the invention, for the manufacture of sector shaped strand, Figure 2 is a fragmental cross-section taken on the line II—II in Figure 1, Figure 3 is a fragmental elevation on an enlarged scale of the front pair of rolls, Figure 4 is a similar view on the same scale of the second pair of rolls, Figure 5 is a diagrammatic view showing the positions of the two pairs of rolls with respect to the conductor section, and Figure 6 is a perspective view of a length of stranded conductor produced by the stranding head shown in the drawings.

Referring now to the drawings, and firstly more particularly to Figures 1 and 2 thereof, it will be seen that the stranding head comprises two roll dies, the first constituted by a pair of shaped rolls 1, and the second by a pair of shaped rolls 2. These rolls are mounted in a frame 3 which is divided transversely of its axis into two parts each constituted by a pair of spaced, parallel side walls 4 united at each end by an apertured end wall 5. The adjacent end walls of the two parts make a spigot and socket joint 6, and are held together by bolts 7 located in ears 8 projecting outwardly from the side walls 4. The other end wall of each part carries a hollow trunnion 9 which is supported in a roller bearing 10 housed in a pedestal 11. The position of the rolls 1 and 2 with respect to the two trunnions and the joint 6 which is co-axial therewith is such that the common axis of the trunnions passes through the die apertures formed by the two pairs of rolls. Generally it passes through the geometrical centre of each die aperture.

It is preferred to rotate the stranding head about this axis by applying a drive to each trunnion from a common driving shaft 12. To this end the shaft 12 may carry a pair of chain wheels 13, each coupled by a chain to a chain wheel 14 mounted on the projecting end of the adjacent trunnion.

Each pair of rolls is mounted and driven in precisely the same way and the following description may be taken as applying either to the first or second pair of rolls. Each roll is detachably mounted on its roll shaft 15 and the rolls are preferably interchangeable so as to facilitate the use of the stranding head for conductors of different shapes and sizes. Each roll shaft 15 of a pair is supported in bearings 16 in the extremities of the limbs of a U-shaped member 17, which limbs are housed in slots 18 in the side walls of the frame. In the case of one roll of a pair (the left hand one of the first pair and the lower one of the second pair as seen in Figure 2) the slots 18 in the walls 4 are normal to the axis of rotation of the head and the position of the lower roll is fixed, its U-shaped support being held in place by a cap 19 bolted to the side walls of the frame. In the case of the other roll of the pair, the slots 18 are disposed normal to a plane containing the axis of that roll and the axis of the stub shafts 20 projecting outwardly, one from each side wall of the frame, and provision is made for a small adjustment of the roll by moving its support up or down the slots in the frame walls. To this end the frame is bridged by a cap member 22 which carries a set screw 23 bearing on a domed surface 24 on the base of the U-shaped member supporting the adjustable roll of the pair. This ensures that the pressure on the roll is correctly distributed. Rotation of each roll of each pair is caused by rotation of the head. This is effected by means of bevel gear wheels 25, which are mounted one on each trunnion but are each restrained from rotating with the trunnion by being anchored to the bearing pedestal by a slipping coupling 26. The couplings serve to proportion the torque applied to each pair of rolls relative to that applied to the draw off capstan. In engagement with each bevel wheel are a pair of bevel pinions 27 rotatably supported one on each of the adjacent stub shafts 20. Each bevel pinion 27 drives a spur wheel 28 mounted on the same stub shaft and each spur wheel 28 drives a spur wheel 29 mounted on one of the adjacent roll shafts. It will now be appreciated that the disposition of the slots 18 housing the support of the adjustable roll of each pair, enables that roll to be adjusted without causing under or over engagement of the teeth of the spur wheels 28 and 29 by which it is driven. For the purpose of adjusting the peripheral speed of the rolls relative to the speed of rotation of the stranding head in order to permit the production of stranded conductors having different lengths of pre-spiralled lay, the spur wheels 28 and 29 are in the form of change wheels.

The stranding head shown is designed for the production of a pre-spiralled strand 31 of the sector shape shown in Figure 6. The component wires 32 of the strand, which may each be either circular or of some pre-shaped rolled section, are led through a preliminary shaping die 33 at the entrance to the rear trunnion, thence along the trunnion and to a second preliminary shaping die 34. These preliminary dies will generally not be in the form of roll dies but of dies with fixed surfaces, as shown. The function of these dies 32 and 33 is to assemble the wires together in their correct positions and lead them to the first roll die and accordingly they may have a shape that is approximately similar to but slightly larger than that of the first roll die. Alternatively they may be of circular cross-section. As was pointed out in the specification above mentioned, it is advisable that the front end of the preliminary shaping die 33 should approach very near to the rolls so as to prevent the roll die from separating the wires between it and the preliminary shaping die due to the squeezing action of the rolls tending to push backward any slack which may exist in the individual wires. For a similar reason it is desirable to place the two pairs of rolls 1 and 2 near together. This is facilitated by the construction of head described, which eliminates the necessity for a bearing between the two roll dies, and by avoiding the use of rolls of large diameter.

The shape of the first pair of rolls is shown more clearly in Figure 3. It will be seen that each roll has a peripheral groove 35 of V-shape, the bottom of the groove being rounded and the walls being inclined at about 45° to the side walls. These two shaped rolls co-operate to form a roll die which imparts to the stranded conductor the form of a parallelogram with rounded corners, as indicated by the chain dotted line 36 in Figure 3. The shape of the second pair of rolls is shown in Figure 4. One of these rolls has a peripheral groove 37 of V-shape with the walls of the groove making an angle of 120° to the sides of the roll and the other has a peripheral groove 38 of arcuate section. The second pair of rolls 2 exerts pressure on the conductor in a direction at right angles to that in which it is exerted by the first pair 1. This does not mean that the two sets of rolls are placed with their axes at right angles to one another (as is shown for the sake of simplicity in Figure 1). There is an additional angular displacement as shown in Figures 2 and 4. This additional displacement which is indicated by the angle $\alpha$ in Figure 4 corresponds to the angular displacement between the cross-section of the pre-spiralled conductor at one roll die relative to that at the other roll die which is necessarily spaced apart from the first die by some small distance along the strand. The angle will naturally vary with the length of pre-spiralled lay and it is desirable to provide for limited angular adjustment of the two roller dies. This is effected as shown in Figure 2 by making the coupling between the two parts of the frames 3 adjustable by providing arcuately extending slots 39 in the ears 8 through which the bolts 7 pass. Where there is a chain or gear drive to each end of the head as shown, an adjustable coupling 40 is preferably inserted in the driving shaft 12 between the two wheels mounted thereon. This coupling will not be required when the head is driven from one end only. The second pair of rolls co-operate to form a roll die of somewhat smaller area of cross-section which squeezes the strand from the form shown in Figure 3 to the form shown by the chain dotted line 41 in Figure 4. This change in shape can be more readily seen from Figure 5 which shows the position of the two roll dies relative to the strand at any one point in the length thereof.

The roll dies described above are designed for the production of pre-spiralled stranded conductor of a sector shape suitable for a 3-core cable. Where conductors of other shape, for instance oval, are required the peripheral surfaces of the rolls to be used will be suitably modified. In the case of an oval strand, one pair of die rolls may be made to compress the strand along the minor axis of the ellipse and the other pair to compress the strand along the major axis of the ellipse. In general, as in the case illustrated, the shape of the active surfaces of the peripheral surfaces of the rolls will not be the same for the two pairs, and they will be designed so that each does not act on the whole of the periphery of the strand, but covers substantially more than half, so that by the action of the two sets of rolls the whole of the periphery may be effectively squeezed.

It will naturally be understood that the construction of stranding head shown in the drawings has been described merely by way of example and that the invention is in no way limited to the particular methods shown of mounting and driving the rolls or the head. For instance, each pair of rolls may be mounted and driven in the way described in the said specification.

It is preferred to reduce the work to be performed by the pull in the strand exerted by the capstan, or other take-up device, to a minimum, that is to say, to little more than that which is necessary to apply the strand to the take-up device and hold it against the tendency to twist which may be applied to it by the pre-spiralling action of the dies. Owing to this reduction of work to be performed by the take-up, the capstan, which is usually employed between the last die and the drum on which the strand is coiled, may be omitted, its place being taken by the drum. In this case the slipping coupling in the drive to the second pair of rolls may be locked, or replaced by a positive anchorage, and the usual slipping coupling be provided in the drive to the take-up drum. The torque at which slipping takes place in this latter coupling is relatively small, so that the loss of power is less than in the drive to the rolls. The slipping coupling in the drive to the first pair of rolls will, of course, generally be retained in order to proportion the value of the torque applied to the first pair of rolls relative to that applied to the second pair.

What we claim as our invention is:

1. In a rotating stranding head for use with a machine for the manufacture of pre-spiralled strand, a roll die comprising a pair of rolls, means for rotatably driving the rolls of said die, a second roll die, in close proximity to the first said roll die, comprising a pair of rolls adapted to act upon the strand passing through the head in a direction transverse to that in which the rolls of the first said die act, and means for rotatably driving the rolls of said second roll die and means for proportioning the value of the torque applied to the rolls of the first said die relative to that applied to the rolls of the said second die.

2. In a rotating stranding head for use with a machine for the manufacture of pre-spiralled strand, a roll die comprising a pair of rolls, means for rotatably driving the rolls of said die, a second roll die in close proximity to the first said roll die, said second roll die comprising a pair of rolls adapted to act upon the strand passing through the head in a direction transverse to that in which the rolls of the first said die act, means for rotatably driving the rolls of said second roll die, and a slipping coupling, inserted in one of said driving means, for proportioning the value of the torque applied to the rolls of the first said die relative to that applied to the rolls of the said second die.

3. In a rotating stranding head for use with a machine for the manufacture of pre-spiralled strand which is drawn off from the head by a draw-off capstan, a roll die comprising a pair of rolls, means for rotatably driving the rolls of said die, a second roll die in close proximity to the first said roll die, said second roll die comprising a pair of rolls adapted to act upon the strand passing through the head in a direction transverse to that in which the rolls of the first said die act, means for rotatably driving the rolls of said second roll die, and a slipping coupling, inserted in each of said driving means, for proportioning the value of the torque applied to the rolls of each of said dies relative to the torque applied to the draw-off capstan.

4. In a rotating stranding head for use with a machine for the manufacture of pre-spiralled strand, a rotatable frame divided transversely of the axis of rotation into two parts, means for coupling together the two parts of said frame in a manner which permits of relative angular adjustment thereof, a roll die comprising a pair of rolls rotatably mounted in one of the two parts of said frame, means for rotatably driving the rolls of said roll die, a second roll die mounted in the other of the two parts of said frame, and means for rotatably driving the rolls of said second roll die.

5. In a rotating stranding head for use in a machine for the manufacture of pre-spiralled strand and comprising a pair of roll dies each comprising a pair of rolls mounted on roll shafts in a rotatable frame, means for driving one roll of each pair, said means comprising a spur wheel on one of the roll shafts, a stub shaft projecting from the frame in a direction parallel to the roll shaft, a second spur wheel mounted on said stub shaft and engaging with the first said spur wheel, a bevel wheel also mounted on the stub shaft and coupled to the second said spur wheel, and a bevel wheel, engaging the first said bevel wheel, mounted co-axially with respect to the axis of rotation of the frame and restrained from rotating therewith.

6. In a rotating stranding head as specified in claim 5, means for adjusting one of the rolls of each roll die to a limited extent in a direction substantially perpendicular to a plane containing the axis of said roll and the axis of the stub shaft carrying the wheels by which said roll is driven.

7. In a rotating stranding head for use in a machine for the manufacture of pre-spiralled strand and comprising a pair of roll dies each comprising a pair of rolls mounted on roll shafts in a rotatable frame, means for rotatably driving one roll of each pair, said means comprising a spur wheel on one of the roll shafts, a stub shaft projecting from the frame in a direction parallel to the roll shaft, a second spur wheel mounted on said stub shaft and engaging with the first said spur wheel, a bevel wheel also mounted on the stub shaft and coupled to the second said spur wheel, a bevel wheel mounted coaxially with respect to the axis of rotation of the frame and in engagement with the first said bevel wheel, and a slipping coupling for restraining the last said wheel from rotating with the frame and serving to control the driving torque applied to the roll driven by said wheels.

PHILIP VASSAR HUNTER.
HARRY HILL.